US007623575B2

(12) United States Patent
Winger

(10) Patent No.: US 7,623,575 B2
(45) Date of Patent: Nov. 24, 2009

(54) METHOD AND APPARATUS FOR SUB-PIXEL MOTION COMPENSATION

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1076 days.

(21) Appl. No.: 11/098,357

(22) Filed: Apr. 4, 2005

(65) Prior Publication Data
US 2006/0146935 A1   Jul. 6, 2006

Related U.S. Application Data

(60) Provisional application No. 60/642,140, filed on Jan. 5, 2005.

(51) Int. Cl.
*H04B 1/66* (2006.01)

(52) U.S. Cl. .................. 375/240.17; 375/240.16; 375/240.15; 375/240.14; 375/240.12

(58) Field of Classification Search ............ 375/240.17, 375/240.16, 240.15, 240.14, 240.12; 382/238, 382/236, 232; 348/699
See application file for complete search history.

(56) References Cited

U.S. PATENT DOCUMENTS

| 6,996,186 B2 * | 2/2006 | Ngai et al. ............. 375/240.29 |
| 2006/0291563 A1 * | 12/2006 | Park et al. ............. 375/240.17 |

* cited by examiner

*Primary Examiner*—Shawn An
(74) *Attorney, Agent, or Firm*—Christopher P. Maiorana, PC

(57) ABSTRACT

A method of motion compensation for an input block is disclosed. The method generally includes the steps of (A) generating a plurality of tap values in response to a motion vector for the input block, (B) generating an interpolated block by programmable filtering a reference block using the tap values, the interpolated block being spatially offset from the reference block by less than a half-pel separation and (C) generating an output block in response to the input block and the interpolated block.

15 Claims, 6 Drawing Sheets

TABLE I

| | A | B | C | D | E | F | G | H | J | K | L | M | N | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|---|---|---|
| 1 | | | | | | | | x | x | x | x | x | x | x | | | | | | | | | | | | | | |
| 2 | | | | | | | | x | x | x | x | x | x | x | | | | | | | | | | | | | | |
| 3 | | | | | | | | x | x | x | x | x | x | x | | | | | | | | | | | | | | |
| 4 | | | | | | | | x | x | x | x | x | x | x | | | | | | | | | | | | | | |
| 5 | | | | | | | | x | x | x | x | x | x | x | | | | | | | | | | | | | | |
| 6 | | | | | | | | x | x | x | x | x | x | x | | | | | | | | | | | | | | |
| 7 | | | | | | | | x | x | x | x | x | x | x | | | | | | | | | | | | | | |
| 8 | | | | | | | | x | x | x | x | x | x | x | | | | | | | | | | | | | | |
| 9 | x | x | x | x | x | x | | | | x | | | | | | | | x | | | | | | | | | | |
| 10 | | | | | | | | | x | x | x | x | x | | | | | x | x | | | | | | | | | |
| 11 | | | | | | | | | x | x | x | x | x | | | | | x | x | | | | | | | | | |
| 12 | | | | | | | | | x | x | x | x | x | | | | | x | x | | | | | | | | | |
| 13 | | | | | | | | | x | x | x | x | x | | | | | x | x | | | | | | | | | |
| 14 | | | | | | | | | x | x | x | x | x | | | | | x | x | | | | | | | | | |
| 15 | | | | | | | | | x | x | x | x | x | | | | | x | x | | | | | | | | | |
| 16 | | | | | | | | | x | x | x | x | x | | | | | x | x | | | | | | | | | |
| 17 | x | x | x | x | x | x | | | | x | | | | | | | | x | | | | | | | | | | |
| 18 | | | | | | | | | x | x | x | x | x | | | | | x | x | | | | | | | | | |
| 19 | | | | | | | | | x | x | x | x | x | | | | | x | x | | | | | | | | | |
| 20 | | | | | | | | | x | x | x | x | x | | | | | x | x | | | | | | | | | |
| 21 | | | | | | | | | x | x | x | x | x | | | | | x | x | | | | | | | | | |
| 22 | | | | | | | | | x | x | x | x | x | | | | | x | x | | | | | | | | | |
| 23 | | | | | | | | | x | x | x | x | x | | | | | x | x | | | | | | | | | |
| 24 | | | | | | | | | x | x | x | x | x | | | | | x | x | | | | | | | | | |
| 25 | x | x | x | x | x | x | | | | x | | | | | | | | x | | | | | | | | | | |
| 26 | | | | | | | | | x | x | x | x | | | | | x | x | x | x | | | | | | | | |
| 27 | | | | | | | | | x | x | x | x | | | | | x | x | x | x | | | | | | | | |
| 28 | | | | | | | | | x | x | x | x | | | | | x | x | x | x | | | | | | | | |
| 29 | | | | | | | | | x | x | x | x | | | | | x | x | x | x | | | | | | | | |
| 30 | | | | | | | | | x | x | x | x | | | | | x | x | x | x | | | | | | | | |
| 31 | | | | | | | | | x | x | x | x | | | | | x | x | x | x | | | | | | | | |
| 32 | | | | | | | | | x | x | x | x | | | | | x | x | x | x | | | | | | | | |
| 33 | x | x | x | x | x | x | | | | x | | | | | | | | x | | | | | | | | | | |
| 34 | | | | | | | | | x | x | x | x | | | | | x | x | x | x | | | | | | | | |
| 35 | | | | | | | | | x | x | x | x | | | | | x | x | x | x | | | | | | | | |
| 36 | | | | | | | | | x | x | x | x | | | | | x | x | x | x | | | | | | | | |
| 37 | | | | | | | | | x | x | x | x | | | | | x | x | x | x | | | | | | | | |
| 38 | | | | | | | | | x | x | x | x | | | | | x | x | x | x | | | | | | | | |
| 39 | | | | | | | | | x | x | x | x | | | | | x | x | x | x | | | | | | | | |
| 40 | | | | | | | | | x | x | x | x | | | | | x | x | x | x | | | | | | | | |
| 41 | x | x | x | x | x | x | | | | x | | | | | | | | x | | | | | | | | | | |
| 42 | | | | | | | | | x | x | x | x | | | | | x | x | x | x | | | | | | | | |
| 43 | | | | | | | | | x | x | x | x | | | | | x | x | x | x | | | | | | | | |
| 44 | | | | | | | | | x | x | x | x | | | | | x | x | x | x | | | | | | | | |
| 45 | | | | | | | | | x | x | x | x | | | | | x | x | x | x | | | | | | | | |
| 46 | | | | | | | | | x | x | x | x | | | | | x | x | x | x | | | | | | | | |
| 47 | | | | | | | | | x | x | x | x | | | | | x | x | x | x | | | | | | | | |
| 48 | | | | | | | | | x | x | x | x | | | | | x | x | x | x | | | | | | | | |
| 49 | x | x | x | x | x | x | | | | x | | | | | | | | x | | | | | | | | | | |
| 50 | | | | | | | | | x | x | | | | | | | x | x | x | x | x | x | | | | | | |
| 51 | | | | | | | | | x | x | | | | | | | x | x | x | x | x | x | | | | | | |
| 52 | | | | | | | | | x | x | | | | | | | x | x | x | x | x | x | | | | | | |
| 53 | | | | | | | | | x | x | | | | | | | x | x | x | x | x | x | | | | | | |
| 54 | | | | | | | | | x | x | | | | | | | x | x | x | x | x | x | | | | | | |
| 55 | | | | | | | | | x | x | | | | | | | x | x | x | x | x | x | | | | | | |
| 56 | | | | | | | | | x | x | | | | | | | x | x | x | x | x | x | | | | | | |
| 57 | x | x | x | x | x | x | | | | x | | | | | | | | x | | | | | | | | | | |
| 58 | | | | | | | | | x | x | | | | | | | x | x | x | x | x | x | | | | | | |
| 59 | | | | | | | | | x | x | | | | | | | x | x | x | x | x | x | | | | | | |
| 60 | | | | | | | | | x | x | | | | | | | x | x | x | x | x | x | | | | | | |
| 61 | | | | | | | | | x | x | | | | | | | x | x | x | x | x | x | | | | | | |
| 62 | | | | | | | | | x | x | | | | | | | x | x | x | x | x | x | | | | | | |
| 63 | | | | | | | | | x | x | | | | | | | x | x | x | x | x | x | | | | | | |
| 64 | | | | | | | | | x | x | | | | | | | x | x | x | x | x | x | | | | | | |

FIG. 6

TABLE II

| G | H | J | K | L | M | N | P | |
|---|---|---|---|---|---|---|---|---|
| 0 | 0 | 0 | 256 | 0 | 0 | 0 | 0 | 0 PHASE |
| 5 | -3 | -14 | 232 | 52 | -24 | 12 | -4 | 1/8 PHASE |
| 2 | 2 | -21 | 200 | 103 | -42 | 19 | -7 | 2/8 PHASE (QUARTER-PEL) |
| -1 | 9 | -34 | 184 | 130 | -42 | 17 | -6 | 3/8 PHASE |
| -4 | 14 | -41 | 159 | 159 | -41 | 14 | -4 | 4/8 PHASE (HALF-PEL, 2 QUARTER PEL) |
| -6 | 17 | -43 | 130 | 184 | -34 | 9 | -1 | 5/8 PHASE |
| -7 | 19 | -42 | 103 | 200 | -21 | 2 | 2 | 6/8 PHASE (3 QUARTER-PEL) |
| -4 | 12 | -24 | 52 | 232 | -14 | -3 | 5 | 7/8 PHASE (REVERSE OF 1/8/ PHASE) |

FIG. 7

METHOD AND APPARATUS FOR SUB-PIXEL MOTION COMPENSATION

This application claims the benefit of U.S. Provisional Application No. 60/642,140, filed Jan. 5, 2005, which is hereby incorporated by reference in its entirety.

FIELD OF THE INVENTION

The present invention relates to digital video motion compensation generally and, more particularly, to a method and apparatus for sub-pixel motion compensation.

BACKGROUND OF THE INVENTION

Motion compensation is a major source of coding gain where most of the compression comes from for video. Current motion compensation approaches in existing standards use short-tap fixed interpolation filters. Conventional encoder and decoder techniques are well known and of reasonable cost for the current approaches. Research has shown that using more taps and making the taps programmable, rather than fixed, can lead to impressively increased compression at a cost. Future international compression standards will likely use such techniques, despite the increased cost, to achieve sufficient compression gains to justify the use of the new standard in existing application domains.

Referring to FIG. 1, a diagram of current approaches for motion compensation interpolations are shown. The current approaches (i.e., H.264 and the proposed H.265) use long sets of filter taps in hierarchical interpolation techniques. The hierarchical interpolation techniques mean that half-pel interpolated values are first interpolated, then quarter-pel interpolated values are derived from the interpolated half-pel values and then eighth-pel interpolated values are derived from the interpolated quarter-pel values. An advantage of the hierarchical approach for programmable filter taps is that typically most of the gain can be derived by only making the first level of interpolation programmable and leaving the other levels fixed so that no filter taps need be transmitted for upper levels of interpolation.

A disadvantage of the existing approaches is that by using multiple levels of interpolation and deriving higher-level interpolated positions from lower-level positions, the upper interpolated levels cannot typically use just bilinear interpolation in order to get the level of performance specified for future video standards. To achieve the specified performance, the higher level interpolation must use more than two taps. As such, a bus-bandwidth used for motion compensation can be significantly increased.

A reason that the hierarchical approach makes economic (i.e., cost-benefit) sense in the current H.264 video coding standard is because the filter values for the half-pel interpolation are fixed and simple, permitting a low-complexity implementation for digital signal processors. Because the second interpolation layer is bilinear, no additional bus bandwidth is consumed generating quarter-pel interpolation values. However, when a second or a third interpolation layer technique utilizes more than two taps (for increased prediction accuracy and coding gain) the hierarchical approach has a real bandwidth penalty increasing cost over a direct interpolation approach.

SUMMARY OF THE INVENTION

The present invention concerns a method of motion compensation for an input block. The method generally comprises the steps of (A) generating a plurality of tap values in response to a motion vector for the input block, (B) generating an interpolated block by programmable filtering a reference block using the tap values, the interpolated block being spatially offset from the reference block by less than a half-pel separation and (C) generating an output block in response to the input block and the interpolated block.

The objects, features and advantages of the present invention include providing a method and/or an apparatus for sub-pixel motion compensation that may (i) use less bus bandwidth than conventional motion compensation approaches, (ii) reduce costs for a motion compensation implementation compared with conventional implementations, (iii) provide sharp filtering, (iv) fetch a least possible worst-case number of pixels from external memory, (v) reduce a total amount of math performed to generate interpolated pixel values compared with conventional approaches, (vi) provide sufficient motion compensation performance for future video coding standards (e.g., H.265) and/or (vii) lower silicon costs compared with existing designs.

BRIEF DESCRIPTION OF THE DRAWINGS

These and other objects, features and advantages of the present invention will be apparent from the following detailed description and the appended claims and drawings in which:

FIG. 6 is an example table indicating integer-pel data samples used to derive the data samples in the positions show in FIG. 4;

FIG. 7 is an example table illustrating possible tap values for some of the positions shown in FIG. 4;

DETAILED DESCRIPTION OF THE PREFERRED EMBODIMENTS

In the text below, the phrase "direct polyphase interpolation" generally means that successive levels (e.g., half-pel, quarter-pel, eighth-pel, etc.) in order from a lowest level (e.g., half-pel) to a highest level (e.g., eighth-pel) of interpolated pixel values may be derived directly from full-pel data without using lower level data that derived from full-pel data (that may potentially have been clipped prior to being so used). In contrast the phrase "hierarchical interpolation" is generally taken to mean that successive levels are use derived lower level (and potentially clipped) interpolated values as input.

The present invention generally concerns direct motion compensation structures and/or methods using direct polyphase interpolation. In particular, multiphase (e.g., 8-tap) filters (or interpolators) may implement direct interpolation of all subpel positions from original (e.g., integer) pixel positions using different tap values for the different subpel positions. The resulting technique is generally cheaper for real-time codecs than conventional multilayer hierarchy approaches where bus bandwidth is a major cost. Direct interpolation may produce sharp filters, fetch a least possible worst-case number of pixels, and may reduce a total amount of math performed to generate the interpolated values in a worst case.

When filter taps are programmable, direct polyphase interpolation (e.g., use multiple taps and change the tap values for the various the subpel positions) for all of the subpel positions is generally economical to implement. For large volume consumer electronics implementations (whether very large scale integration (VLSI), digital signal processing (DSP) or similar technologies), a conventional multilayer hierarchical approach may be more expensive than a comparably performing direct interpolation scheme of the present invention. The hierarchical approach generally involves a higher worst-case bus bandwidth to fetch extra pixels for conventional cascaded filters absent from the present invention.

Figure 1:
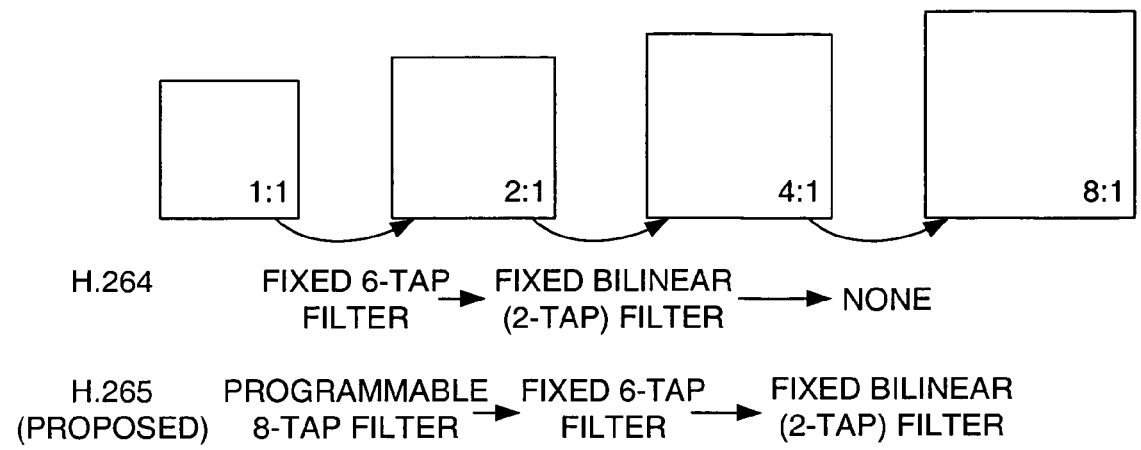
FIG. 1 is a diagram of current approaches for motion compensation interpolations.
Figure 2:
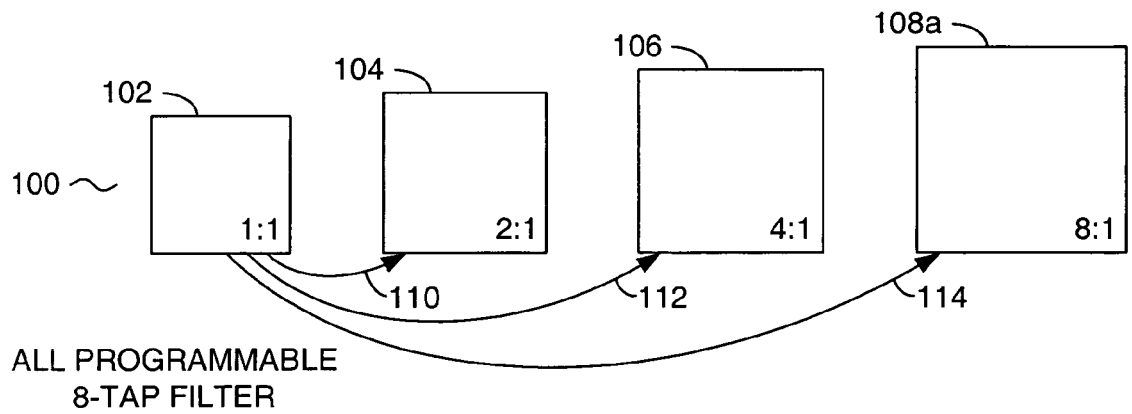
FIG. 2 is a block diagram of a first example direct polyphase interpolation.
Figure 3:
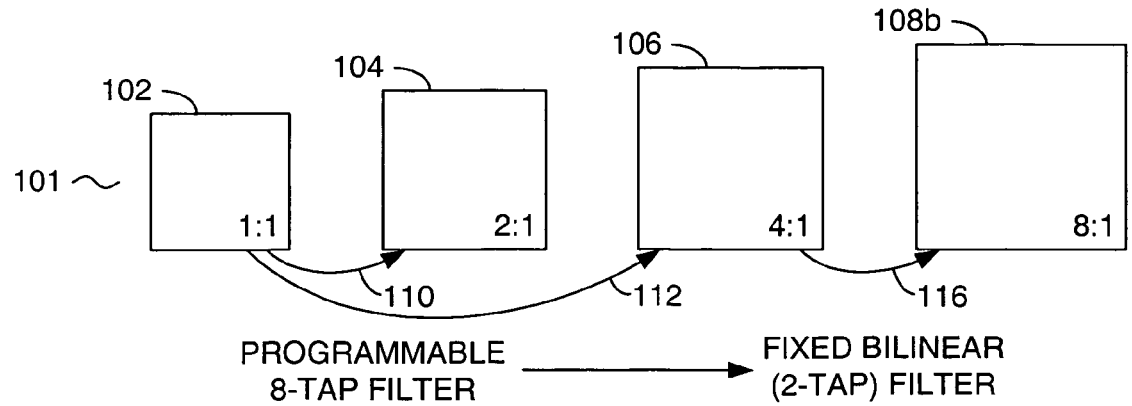
FIG. 3 is a block diagram of a second example direct polyphase interpolation.

Referring to FIGS. 2 and 3, block diagrams of example direct polyphase interpolations 100 and 101 are shown in accordance with a preferred embodiment of the present invention. The interpolation 100 generally comprises an initial block (or image) 102, a first interpolated block (or image) 104, a second interpolated block (or image) 106 and a third interpolated block (or image) 108a. The interpolation 101 generally comprises the initial block 102, the first interpolated block 104, the second interpolated block 106 and a third interpolated block (or image) 108b.

A first interpolation operation 110 may generate the first interpolated block 104 directly from the initial block 102. A second interpolation operation 112 may generate the second interpolated block 104 directly from the initial block 102. A third interpolation operation 114 may generate the third interpolated block 108a directly from the initial block 102. A fourth interpolation operation 116 may generate the third interpolated block 108b directly from the second interpolated block 106.

The initial block 102 may be referred to as an integer-pel block. The integer-pel block 102 generally comprises a matrix of luminance data or chrominance data. The data in the integer-pel block 102 may be aligned on an integer-pel grid having a unit separation between positions. The inter-pel grid may define a 2×2 4×4, 4×8, 8×4, 8×8, 8×16, 16×8 or a 16×16 grid. Other grid arrangements may be implemented to meet the criteria of a particular application.

The first interpolated block 104 may be referred to as a half-pel block. The half-pel block 104 may have the same shape and size as the integer-pel block 102. The data in the half-pel block 104 may be generated directly from the data in the integer-pel block 102. The data in the half-pel block 104 may be aligned on a half-pel grid spatially offset from the integer-pel grid by a one-half unit horizontally and/or vertically.

The second interpolated block 106 may be referred to as a quarter-pel block. The quarter-pel block 106 may have the same shape and size as the integer-pel block 102. The data in the quarter-pel block 106 may be generated directly from the data in the integer-pel block 102. The data in the quarter-pel block 106 may be aligned on a quarter-pel grid spatially offset from the integer-pel grid by one or more one-quarter units horizontally and/or vertically.

Each of the third interpolated blocks 108a and 108b may be referred to as an eighth-pel block. The eighth-pel blocks 108a and 108b may have the same shape and size as the integer-pel block 102. The data in the eighth-pel block 108a may be generated directly from the data in the integer-pel block 102. The data in the eighth-pel block 108b may be generated directly from the data in the quarter-pel block 106. The data in the eighth-pel blocks 108a and 108b may be aligned on an eight-pel grid spatially offset from the integer-pel grid by one or more one-eight units horizontally and/or vertically.

Each of the interpolation operations 110-114 may use a direct multi-tap (e.g., 8-tap) interpolation (or filtering). The interpolation operation 116 may use a fixed bilinear (e.g., 2-tap) interpolation. Changing the tap values used by the multi-tap filtering to get the proper subpel estimates, rather than conventionally deriving the quarter-pel values from the half-pel values, may achieve the same coding gain as the conventional techniques.

The half-pel tap values, quarter-pel tap values and/or eighth-pel tap values used by the interpolations 110-114 may be derived from a reduced transmitted and/or stored set of common parameters for the various interpolated levels. For example, the common parameter set may be a set of half-pel tap values. In one embodiment, both the half-pel and the quarter-pel tap values may be derived using the same set of specified/transmitted/derived tap values. In another embodiment, the quarter-pel tap values may match the half-pel tap values. Other methods of generating the tap values may be implemented to meet the criteria of a particular application.

Generating the higher level interpolated blocks 106 and 108a directly from the integer-pel block 102 generally provides saving in bus bandwidth consumption compared with conventional approaches. For example, in the proposed H.265 hierarchical approach (8 programmable half-pel taps, 6 fixed quarter-pel taps and bilinear eighth-pel taps), motion compensation of a 4×4 block fetches a 13×13 block of data samples in a worst-case bus bandwidth utilization. In particular, a half-pel interpolated block is conventionally generated from $(4+7)\times(4+7)=11\times11=121$ data samples. However, a quarter-pel block is conventionally generated from $(4+7+2)\times(4+7+2)=13\times13=169$ data samples. Conventional generation of an eighth-pel block is performed from the quarter-pel block and thus 13×13=169 data samples are fetched across the bus. In the present invention, all of the 4×4 quarter-pel values may be derived directly from 11×11=121 integer-pel data samples fetched via the bus. Fetching 121 samples instead of 169 samples generally saves the bus bandwidth by approximately 30 percent without suffering any interpolation performance (e.g., 8 programmable taps may be available for the quarter-pel estimates).

The programmability of the filter generally allows adjustments to the sharpness of the interpolated blocks 104, 106, 108a and 108b. Programmability of the integer samples to be filtered may provide flexibility in how the interpolations are created. Furthermore, deriving all of the interpolated sub-pel values, including eighth-pel samples, directly from the integer pixels may lower a complexity for calculating a worst-case motion compensated position (e.g., an eighth-pel position).

Several different embodiments may be implemented for the present invention. For example, a first embodiment may apply the direct polyphase interpolation with programmable filter taps. A second embodiment may incorporate the direct polyphase interpolation, the programmable filter taps and derive the polyphase tap values from a (reduced) set of common parameters (e.g., the quarter-pel tap values may be dependent of the half-pel tap values). In a third embodiment, a hybrid of direct polyphase interpolation for at least one lower level and fixed hierarchical interpolation for at least one upper level may be implemented. In a fourth embodiment may use the hybrid of direct polyphase interpolation for at least one lower level and fixed hierarchical interpolation for at least one upper level plus the programmable filter taps. A fifth embodiment may combine all of the hybrid of direct polyphase interpolation for at least one lower level and fixed hierarchical interpolation for at least one upper level, the programmable filter taps and derive the polyphase tap values from a (reduced) set of common parameters. In still other embodiments, the hybrid approaches may include direct polyphase interpolation for more than a single lower interpolation level.

Figures 4, 5:
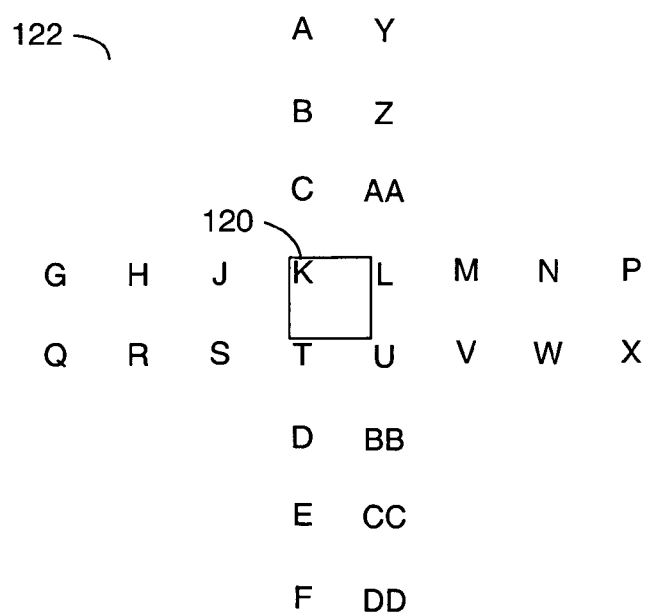
FIG. 4 is a diagram of an example narrow region of data samples at an eighth-pel interpolation level.
FIG. 5 is a diagram of an example wide region of select data samples around the narrow region.

Referring to FIG. 4, a diagram of an example narrow region 120 of data samples to the eighth-pel interpolation level is shown. The narrow region 120 generally defines an 8×8 matrix (or grid) with an integer-pel data sample (e.g., luminance or chrominance) in an upper left-hand corner. Each of the positions in the 8×8 matrix is generally identified by a label number 1-64 reading left-to-right and top-to-bottom. Neighboring integer-pel data samples (e.g., L, T and U) one unit from the data sample K are also illustrated. The half-pel positions may be offset from integer-pel positions by a one-half unit distance horizontally and/or vertically. The quarter-pel positions may be offset from the integer-pel positions by N one-quarter units both horizontally and/or vertically (where N=1, 2 and 3). The eighth-pel positions may be offset from the integer-pel positions by M one-eighth units both horizontally and/or vertically (where M=1, 2, 3, 4, 5, 6 and 7).

Referring to FIG. 5, a diagram of an example wide region 122 of select data samples around the narrow region 120 is shown. The select data samples in the wide region 122 generally comprise integer-pel data samples in-line with the data sample K both vertically (e.g., A, B, D, K, T, D, E and F) and horizontally (e.g., G, H, J, K, l, M, N and P). The wide region 122 may also illustrate the integer-pel data samples in-line with the data sample U both horizontally (e.g., Q, R, S, T, U, V, W and X) and vertically (e.g., Y, Z, AA, L, U, BB, CC and DD). The present invention may use some or all of the 28 integer-pel data samples identified above as inputs to an 8-tap filter to directly derive all of the half-pel data samples, the quarter-pel data samples and/or the eighth-pel data samples illustrated in FIG. 4. Derivation of the integer-pel sample K may be a simple filtering where all of the tap values may be set to zero except the tap value associated with the data sample K, which may be set to one or unity.

Referring to FIG. 6, an example TABLE I is shown indicating which integer-pel data samples A-DD may be used to derive the data samples in the 64 positions show in FIG. 4. An "X" in the table generally indicates that the FIG. 5 integer-pel data sample at the top of the respective column may be input into the 8-tap filter to generate a data sample at the FIG. 4 position indicated at the left side of the respective row. Other arrangements of the TABLE I may be implemented to meet the criteria of a particular application. In applications where the integer-pel sample locations may be determined dynamically and/or by the author of the video content, the integer-pel locations actually used may be transmitted/stored along with the corresponding blocks.

Generation of the tap values used to scale (multiply) the respective selected data samples may be permanently stored (e.g., a lookup table) and/or generated on-the-fly based on one or more parameters common to some or all of the interpolation levels. For example, row 1 of TABLE I generally indicates that eight of the integer-pel data samples (e.g., G, H, J, K, L, M, N and P) may be used to generate the integer-pel data sample K. Therefore, tap values of G=0, H=0, J=0, K=1 (unity), L=0, M=0, N=0 and P=0 may be permanently stored in or accessible to a motion compensation circuit to allow the integer-pel data sample to pass through the 8-tap filter unaltered. Eight integer-pel data samples may be used to generate the half-pel samples, the quarter-pel samples and the eighth-pel samples in the other rows of TABLE I.

Referring to FIG. 7, an example TABLE II generally illustrates several possible tap values for the FIG. 4 positions 1-8. Normal weights for the tap values may range from −256 to 255. A weight of 256 may signal a bypass (or feed-through) of the 8-tap filter. Similar tap values may be implemented for the positions 9-64. Furthermore, the various tap values for the higher interpolation levels may be derived from the tap values used for the lower interpolation levels. In applications where the tap values may be fixed for each position, the tap values may be stored locally to the motion compensation circuit. In applications where the tap values may change dynamically and/or adjusted by the author of the video content, the full set, or at least a reduced set of the actual tap values used may be transmitted/stored with the corresponding blocks. The relative integer-pel positions and associated tap values used to generate a single interpolated data sample may be used repeatedly for each of the interpolated data samples in a block (e.g., a 4×4 block) of data samples.

Figure 8:
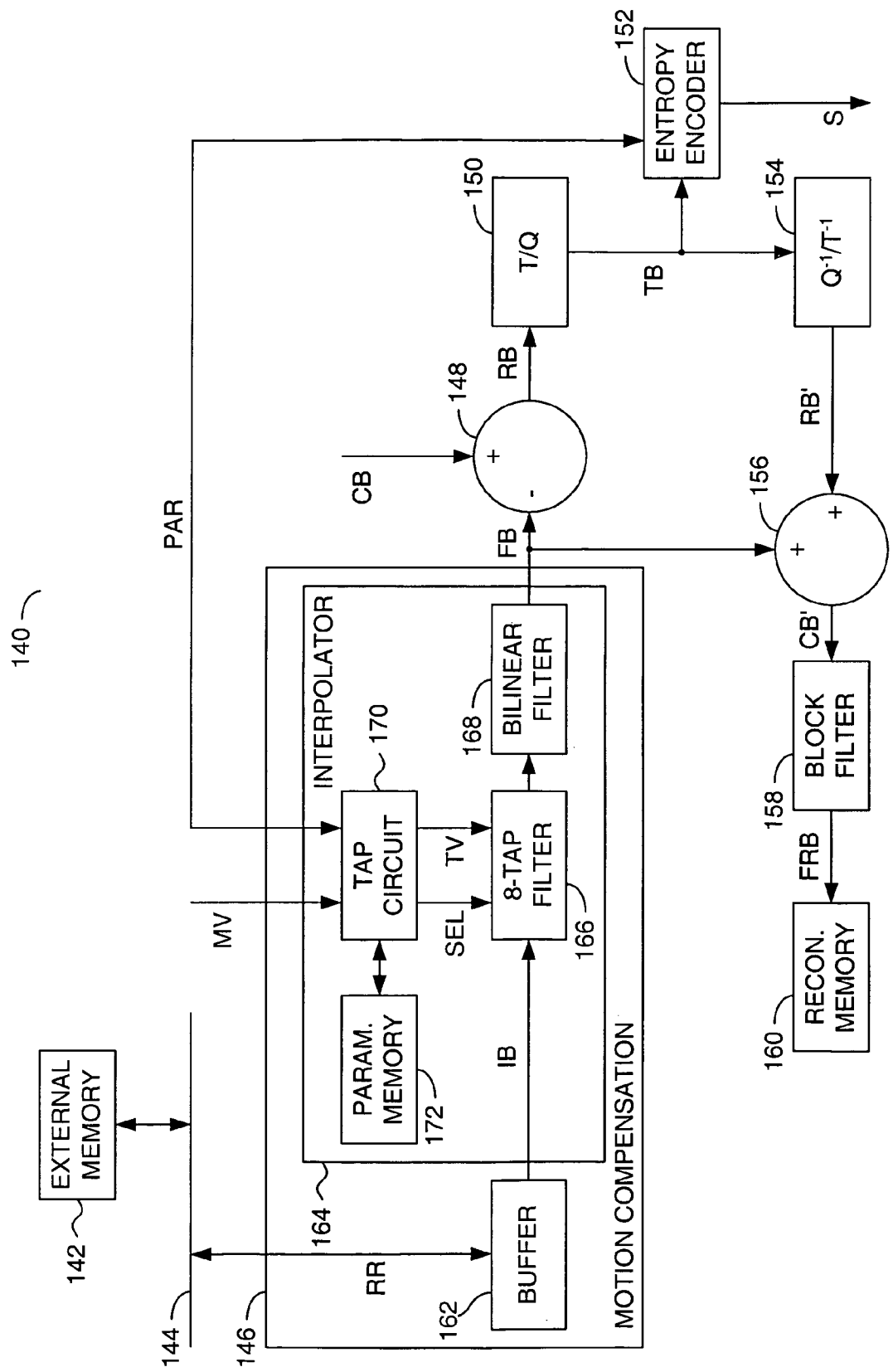
FIG. 8 is a block diagram of an example implementation of an encoder system.

Referring to FIG. 8, a block diagram of an example implementation of an encoder system (or circuit) 140 is shown. The encoder system 140 generally comprises an external memory circuit (or module) 142, a bus (or module) 144, a motion compensation circuit (or module) 146, a subtractor circuit (or module) 148, a transform/quantization circuit (or module) 150, an entropy encoder circuit (or module) 152, an inverse quantization/transform circuit (or module) 154, an adder circuit (or module) 156, a block filter circuit (or module) 158 and a reconstructed memory circuit (or module) 160. The motion compensation circuit 146 generally comprises a buffer memory circuit (or module) 162 and an interpolator circuit (or module) 164. The interpolator circuit 164 generally comprises a programmable filter circuit (or module) 166, an optional fixed filter circuit (or module) 168, a tap circuit (or module) 170 and an optional parameter memory circuit (or module) 172.

The encoder system 140 may be operational to generate an output bitstream (e.g., S) by compressing blocks of video data samples based on reference frames buffered in the external memory circuit 142. The reference frames generally comprise integer-pel level pixel data. A block of the reference frame data samples (e.g., an 11×11 block of luminance samples) may be transferred from the external memory circuit 142 to the motion compensation circuit 146 via the bus 144 in a signal (e.g., RR). The reference block may be temporarily stored in the buffer circuit 162. The interpolator circuit 164 may be operational to read several (e.g., eight) of the integer-pel data samples of the reference block in a signal (e.g., IB) from the buffer circuit 162 based on a motion vector value received in a signal (e.g., MV). The motion vector value may have a subpel resolution and point to any one of the 64 positions in FIG. 4. The interpolator circuit 164 may generate an interpolated (filtered) block of data samples (e.g., a 4×4 block) in a signal (e.g., FB). The interpolated block may be based on the interpolation level, integer-pel positions and tap values used in the interpolation process. The interpolator circuit 164 may also be operational to generate a signal (e.g., PAR) conveying the parameters used to identify the integer-pel locations and tap values used in generating the interpolated block.

The subtractor circuit 148 may be operational to subtract the interpolated block in the signal FB from a current block (input block) of video samples received in a signal (e.g., CB) to present a residual block in a signal (e.g., RB). The transform/quantization circuit 150 may be operational to perform a discrete cosine transform and quantization on the residual block to generate a transformed block in a signal (e.g., TB). The entropy encoder circuit 152 may be operational to reorder and entropy encode the transformed block to generate an encoded block. The entropy circuit 152 may also be operational to present the encoded block and the parameters from the signal PAR in the bitstream S.

The transformed block may also be presented to the inverse quantization/transform block 154. The inverse quantization/transform block 154 may be operational to inverse quantize and perform an inverse discrete cosine transform on the transformed block to present a reconstructed residual block in a signal (e.g., RB'). The adder circuit 156 may be operational to add the reconstructed residual block to the interpolated block to generate a reconstructed current block (output block) in a signal (e.g., CB'). The block filter circuit 158 may be operational to perform a block filtering of the reconstructed current block to generate a filtered reconstructed block in a signal (e.g., FRB). The reconstructed memory circuit 160 may buffer the filtered reconstructed block awaiting possible transfer back to the external memory circuit 142 as part of a new reference frame.

The programmable filter circuit 166 may be operational to either (i) interpolate the reference block received in the signal IB to (a) a base interpolation level (e.g., no interpolation) or (b) one or more higher interpolation levels or (ii) pass the reference block through (e.g., no interpolation) into the signal FB. The programmable filter circuit 166 may be implemented as an 8-tap filter circuit having programmable taps. Other numbers of programmable taps may be implemented to meet the criteria of a particular application. Selection of the particular integer-pel positions to be applied to the taps may be received via a signal (e.g., SEL). The tap values may be received via a signal (e.g., TV)

The optional fixed filter circuit 168 may be operational to interpolate an intermediate block generated by the programmable filter circuit 166 up to a higher (finer) interpolation level. The fixed filter circuit 168 may be implemented as a bilinear (e.g., 2-tap) filter circuit. In one embodiment, the programmable filter circuit 166 may be operational to perform the programmable 8-tap filtering in a first pass and the bilinear filtering in a second pass, with the intermediate results from the first pass stored in the buffer circuit 162.

Figure 9:
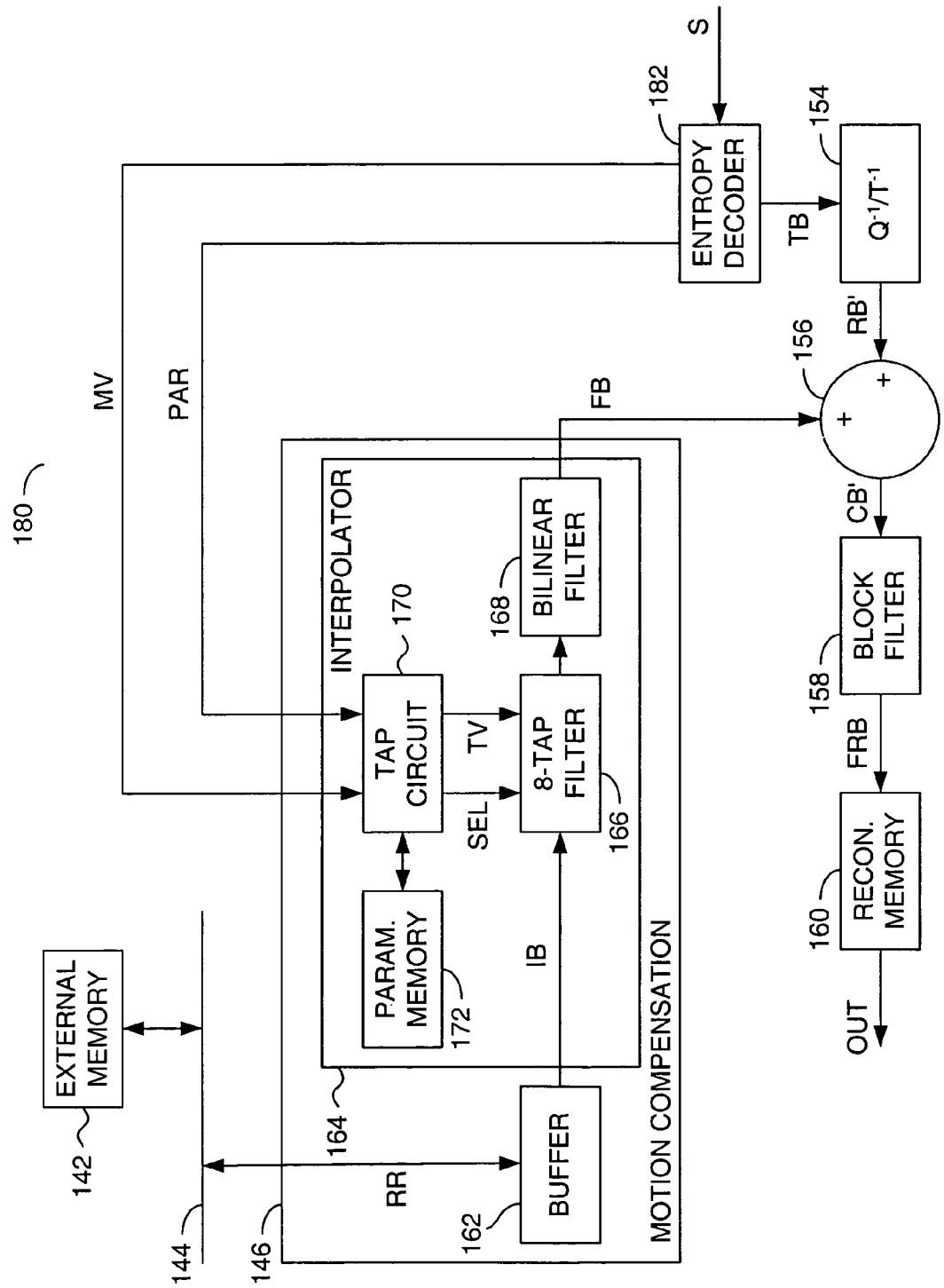
FIG. 9 is a block diagram of an example implementation of a decoder system.

The tap circuit 170 may be operational in one of two different modes, depending on the system 140 or 180 (FIG. 9). In the encoder system 140, the tap circuit 170 may be configured to (i) determine the parameters used in the interpolation based on information stored in the parameter memory circuit 172, (ii) generate the signal SEL based on the motion vector values and the parameters to identify the integer-pel positions being used from the reference block, (iii) generate the tap values in the signal TV based on the motion vector values, the parameters and the identified integer-pel positions and (iv) optionally present the parameters in the signal PAR. In a decoder system 180, the tap circuit 170 may be configured to (i) determine the parameters based on information read from the parameter memory circuit 172 and/or possibly information received in the signal PAR, (ii) generate the signal SEL based on the motion vector values and the parameters, (iii) generate the tap values based on the motion vector values, the parameters and the integer-pel positions and (iv) optionally write the generated parameters back into the parameter memory circuit 172.

The parameter memory circuit 172 may be used to store full or partial sets of parameters for use by the tap circuit 170. Storage of the parameters may be in the form of a lookup table. The parameter memory circuit 172 may also be used to store information regarding which integer-pel positions should be used for which interpolation operations. Storage of the integer-pel position data may be in the form of another lookup table. In an application where the parameters and/or position information should be permanent, the parameter memory circuit 172 may be implemented as a nonvolatile memory.

Referring to FIG. 9, a block diagram of an example implementation of a decoder system (or circuit) 180 is shown. The decoder system 180 is similar to the motion compensation and feedback path of the encoder system 140. Similar functioning elements in both the encoder system 140 and the decoder system 180 may have the same reference numbers. The decoder system 180 generally comprises the external memory circuit 142, the bus 144, the motion compensation circuit 146, the inverse quantization/transform circuit 154, the adder circuit 156, the block filter circuit 158, the reconstructed memory circuit 160 and an entropy decoder circuit (or module) 182.

The entropy decoder circuit 182 may be operational to perform an entropy decode and reorder on the encoded block in the bitstream S to present the reconstructed transform block in the signal TB. The entropy decoder circuit 182 may also be operational to extract the parameters and motion vectors from the bitstream S. The parameters may be presented from the entropy decoder circuit 182 to the motion compensation circuit 146 via the signal PAR. The motion vector values may be presented from the entropy decoder circuit 182 to the motion compensation circuit 148 via the signal MV.

The motion compensation circuit 146 may receive a reference block from the external memory circuit 142 via the bus 144 in the signal RR. The motion compensation circuit 146 may be operational to generate the interpolated block in the signal FB by interpolating the reference block based on the parameters and the motion vector value.

The inverse quantization/transform circuit 154 may be operational to inverse quantize and inverse transform the reconstructed transformed block to present the reconstructed residual block in the signal RB'. The adder circuit 156 may add the interpolated block to the reconstructed residual block to present the reconstructed current block in the signal CB'. The block filter circuit 158 may be operational to block filter the reconstructed current block to present the filtered reconstructed block in the signal FRB. The reconstructed memory circuit 160 may buffer the filtered reconstructed block awaiting (i) output for display via a signal (e.g., OUT) and (ii) possible transfer back to the external memory circuit 142 as part of a new reference frame.

The function performed by the tables of FIGS. 6 and 7 and the modules of FIGS. 8 and 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method of motion compensation for an input block performed by an interpolator, comprising the step of:
   (A) using said interpolator, generating a plurality of tap values in response to a motion vector for said input block;
   (B) generating an interpolated block by programmable filtering a reference block using said tap values, said interpolated block being spatially offset from said reference block by less than a half-pel separation; and
   (C) generating a motion compensated output block in response to said input block and said interpolated block, wherein generating said tap values is in further response to a plurality of parameters common to a plurality of interpolation levels possible for said interpolated block.

2. The method according to claim 1, wherein said parameters comprise a plurality of half-pel tal values.

3. The method according to claim 1, further comprising the step of transmitting said parameters in a bitstream.

4. The method according to claim 1, further comprising the step of extracting said parameters from a bitstream.

5. The method according to claim 1, further comprising the step of:
   fixed filtering said interpolated block at least one interpolation level higher after said programmable filtering.

6. The method according to claim 5, wherein said tap values for a quarter-pel interpolation match said tap value for a half-pel interpolation.

7. The method according to claim 1, further comprising the step of:
   altering said tap value to adjust a sharpness of said output block.

8. The method according to claim 1, wherein said plurality of tap values comprise at least eight tap values.

9. A system comprising:
   a programmable filter (i) having a plurality of programmable taps and (ii) configured to generate an interpolated block directly from a reference block having an integer-pel resolution, said interpolated block being at least two interpolation levels above said reference block;
   an adder configured to generate a reconstructed block by adding said interpolated block to a residue block; and
   a tap module configured to generate a plurality of tap values for said programmable taps, wherein said tap module is further configured to generate said tap values in response to at least one parameter common to said interpolation levels.

10. The system according to claim 9, further comprising a fixed filter configured to interpolate said interpolated block at least one finer interpolation level.

11. The system according to claim 10, further comprising a tap module configured to generate a plurality of tap values for said programmable taps.

12. A method of motion compensation for an input block performed by an interpolator, comprising the step of:
   (A) using said interpolator, generating a first block greater than one interpolation level above a reference block by first filtering said reference block;
   (B) generating a second block at least one interpolation level above said first block by second filtering said first block;
   (C) generating a motion compensated output block by adding said second block to said input block;
   (D) programming a plurality of tap values for said first filtering; and
   (E) generating said tap values from a plurality of parameters common to said interpolation levels.

13. The method according to claim 12, wherein said first block consist of a quarter-pel interpolated block and said second block consist of an eighth-pel interpolatated block.

14. The method according to claim 12, futher comprising the step of:
   generating a third block by third filtering said reference block to a half-pel interpolation level.

15. The method according to claim 14, further comprising the step of:
   generating a plurality of tap values said third filtering based on a plurality of parameters common with said first filtering.

* * * * *